United States Patent
Hoppe et al.

(10) Patent No.: US 7,286,138 B2
(45) Date of Patent: *Oct. 23, 2007

(54) DISCONTINUITY EDGE OVERDRAW

(75) Inventors: Hugues Hoppe, Redmond, WA (US); John Michael Snyder, Redmond, WA (US); Pedro Vieira Sander, New York, NY (US); Steven J. Gortler, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 233 days.

This patent is subject to a terminal disclaimer.

(21) Appl. No.: 11/062,688

(22) Filed: Feb. 22, 2005

(65) Prior Publication Data

US 2005/0134605 A1 Jun. 23, 2005

Related U.S. Application Data (63) Continuation of application No. 09/851,701, filed on May 8, 2001, now Pat. No. 6,919,906.

(51) Int. Cl.
*G06K 9/40* (2006.01)
*G09G 5/00* (2006.01)
*G06T 15/50* (2006.01)
*H04N 5/225* (2006.01)

(52) U.S. Cl. ............... 345/611; 345/426; 345/428; 345/581; 382/254; 382/263; 382/269

(58) Field of Classification Search ........ 345/418–423, 345/426–428, 581–583, 501, 611–614, 619, 345/618, 441–443, 617; 282/254–255, 266, 282/263, 264, 268, 269, 275; 382/254, 255, 382/266, 263, 264, 268, 269, 275
See application file for complete search history.

(56) References Cited

U.S. PATENT DOCUMENTS

| | | | |
|---|---|---|---|
| 5,123,085 A | 6/1992 | Wells et al. | 345/421 |
| 5,742,277 A * | 4/1998 | Gossett et al. | 345/611 |
| 6,037,949 A | 3/2000 | DeRose et al. | 345/582 |
| 6,240,197 B1 * | 5/2001 | Christian et al. | 382/103 |
| 6,529,207 B1 * | 3/2003 | Landau et al. | 345/619 |
| 6,919,906 B2 * | 7/2005 | Hoppe et al. | 345/611 |
| 2003/0016221 A1 * | 1/2003 | Long et al. | 345/441 |

OTHER PUBLICATIONS

Hoppe, Progressive Mesh, Apr. 1996, Microsoft Research, pp. 99-108.

* cited by examiner

*Primary Examiner*—Wesner Sajous
(74) *Attorney, Agent, or Firm*—Lee & Hayes, PLLC (57) ABSTRACT

Systems and methods for discontinuity edge overdraw are described. In one aspect, a polygonal mesh is rendered to produce a computer-generated image. The image exhibits aliasing at its discontinuity edges. The discontinuity edges are sorted prior to overdrawing. The discontinuity edges are overdrawn as anti-aliased lines to reduce the aliasing.

20 Claims, 5 Drawing Sheets

SYMMETRIC
BLENDING

Fig. 7

ASYMMETRIC
BLENDING

DISCONTINUITY EDGE OVERDRAW

RELATED APPLICATIONS

This patent application is a continuation under 37 CFR 1.53(b) of U.S. patent application Ser. No. 09/851,701, titled "Discontinuity Edge Overdraw", filed on May 8, 2001 now U.S. Pat. No. 6,919,906, and hereby incorporated by reference.

TECHNICAL FIELD

This invention relates to computer graphics, and more particularly, to techniques for reducing aliasing along boundaries.

BACKGROUND

Aliasing is an important problem when rendering triangle or other polygonal meshes. Computer graphics has long dealt with the issue of creating discrete images without aliasing. For the hardware-accelerated triangle rendering pipeline, four forms of aliasing can be identified:

(1) Aliasing within triangle interiors (undersampling of shading function). One such example is aliasing due to texture undersampling, which can be efficiently handled using mipmaps or higher-quality anisotropic filtering. Other shading variations, like pinpoint specular highlights, can exhibit high frequencies that are more difficult to predict and bandlimit.

(2) Aliasing at triangle edges (appearance discontinuities).

(3) Aliasing among triangles (subpixel-sized triangles, also known as the "small object" problem). This problem is partially helped by level-of-detail control. Robust solution requires adequate supersampling or analytic anti-aliasing.

(4) Aliasing at triangle intersections (where one triangle passes through another). Static intersections can be preprocessed to yield explicit sharp edges using polyhedral CSG. Dynamic intersections are difficult to anti-alias without supersampling.

With current graphics hardware, a simple technique for reducing aliasing is to supersample and filter the output image. On current displays (desktop screens of approximately 1K×1K resolution), 2×2 supersampling reduces but does not eliminate aliasing. Of course, a finer supersampling resolution further reduces aliasing but rapidly becomes impractical.

One can implement 2×2 supersampling either by increasing the frame buffer resolution by a factor of four, or by accumulating four subpixel-offset images of the same scene for each frame. Both approaches are costly. The first requires four times the frame buffer memory and four times the fill-rate. The second requires four times the geometry processing, four times the fill-rate, and the addition of an accumulation buffer. The impact is that fill-rate-bound rendering becomes up to four times slower, and memory capacity is consumed that could otherwise be devoted to storing texture maps or caching geometry.

Figure 1:
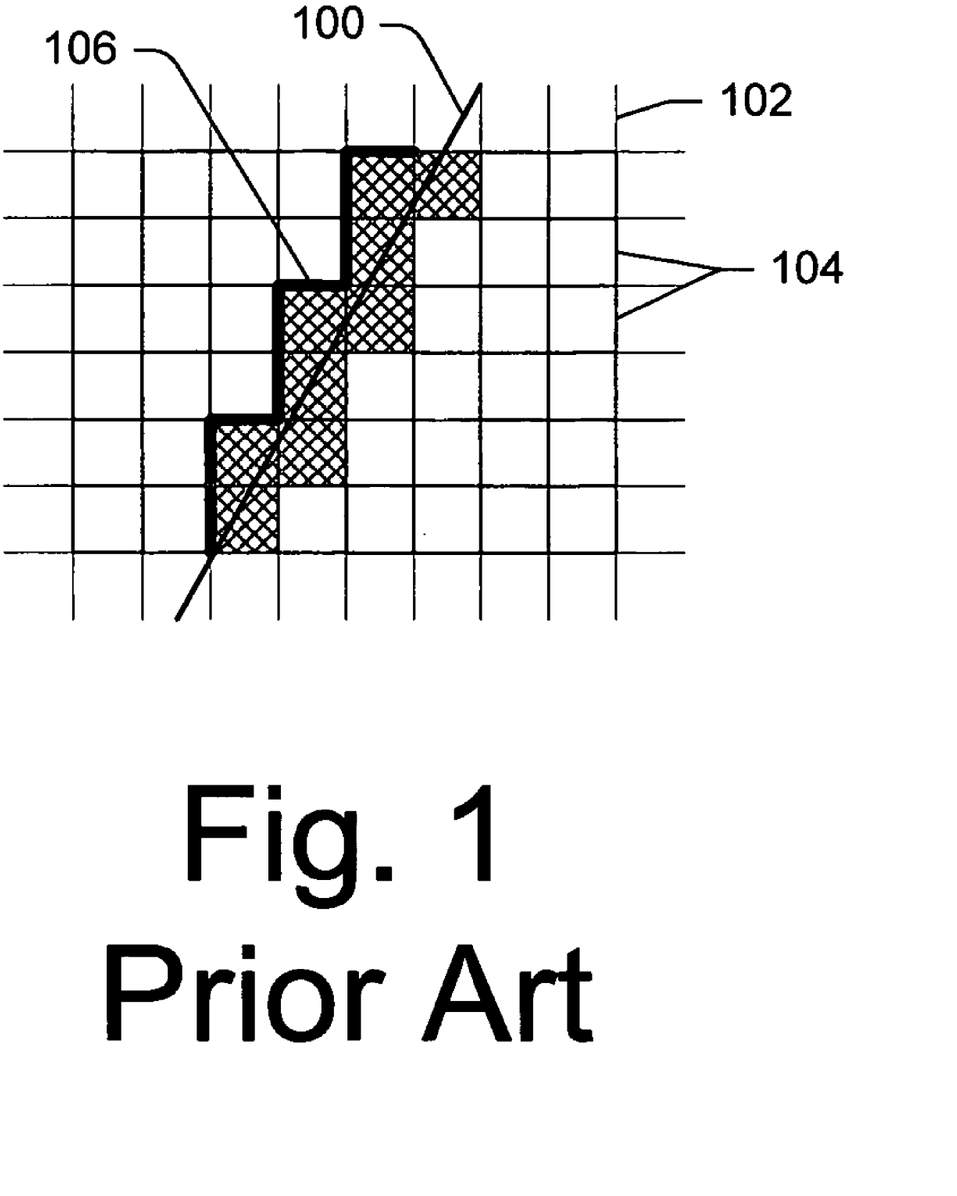
FIG. 1 illustrates a conventional aliasing artifact, known as "crawling jaggies", that occurs at an edge of a rendered polygon mesh.

Much of the aliasing in current hardware rendering occurs along discontinuity edges. Perhaps most objectionable are the "crawling jaggies" that appear near discontinuity edges as a model moves. FIG. 1 shows a magnified triangle edge 100 to illustrate such "crawling jaggies". The edge 100 is drawn on a grid 102 of pixels 104. Pixels touching the edge 100 are assigned to the triangle edge, resulting in a stair-stepped, jagged artifact 106. When the image moves, this jagged artifact appears to crawl along the edge, making them highly noticeable to an observer.

Such artifacts are perceptible even at high display resolutions where static spatial aliasing is less obvious, and are observable even with 2×2 supersampling. Since discontinuity edges typically cover only a small fraction of pixels, supersampling every pixel seems a brute-force solution.

Many general techniques to reduce aliasing have been used in computer graphics, including uniform supersampling, adaptive supersampling, analytic prefiltering, and stochastic sampling. Adaptive supersampling attempts to focus computation on troublesome areas such as discontinuity edges. However, adaptive supersampling is difficult to make robust and implement in hardware. Prefiltering approaches band-limit the continuous signal corresponding to a geometric primitive (such as a constant-colored polygon fragment), before actually point-sampling it. They require expensive visibility determinations over areas rather than points. Stochastic sampling methods convert aliasing to less objectionable noise (rather than "crawling jaggies"), but still require oversampling to acceptably reduce aliasing artifacts.

Coverage bitmask approaches supersample only coverage rather than full r, g, b, z samples. These are effective at reducing artifacts at discontinuity edges, but fail to eliminate aliasing at triangle intersections. Like traditional uniform supersampling, they are brute-force solutions since a coverage bitmask must be computed and stored at every pixel (typically 16-32 extra bits). Moreover, these schemes maintain a list of fragments projecting onto each pixel.

The OpenGL® application program interface (API) introduced by SGI offers a "polygon anti-aliasing" feature, available on some high-end graphics workstations, that renders polygons with anti-aliased boundaries. It uses a special blending mode (source_alpha_saturate) and only works when the polygons are sorted front-to-back. A similar feature is also exposed in the DirectX® API from Microsoft Corporation.

Another approach is to only anti-alias discontinuity edges. One technique is to tag discontinuity edges and anti-alias them using prefiltering convolution in a scanline renderer. Another technique infers discontinuity edges in an aliased image as a post-process. Pixels near discontinuities are then modified to account for coverage of the inferred edges. This method gets confused at texture discontinuities, ignores temporal aliasing, and is likely too expensive to perform at interactive rates.

More recently, silhouette clipping has been proposed as a way to reduce anti-aliasing along discontinuity edges. See, P. Sander, X. Gu, S. Gortler, H. Hoppe, and J. Snyder, "Silhouette Clipping", SIGGRAPH 2000, pp. 327-334. With silhouette clipping, a coarse mesh is clipped to the exact silhouette of a detailed mesh using the stencil buffer. By transferring the stencil to the alpha buffer and redrawing silhouette edges as anti-aliased lines, the external silhouette is anti-aliased. However, this solution is limited to external silhouettes, and is not more generally applied to reducing aliasing at both internal and external silhouettes, as well as all discontinuity edges.

In another recent paper, the authors sketch a two-pass software rendering approach for anti-aliasing silhouette edges. See, F. Sauer, O. Masclef, Y. Robert, and P. Deltour, "Outcast: programming towards a design aesthetic", 1999 Game Developers Conference, pp. 811-827. Unfortunately, the second pass bloats foreground pixels near silhouettes by computing edge coverage at each pixel. The method handles only silhouettes and detects these by exhaustive search. The paper lacks details on how polygons are rasterized or how the two passes are composited. U.S. Pat. No. 6,005,580 to Donovan, which is entitled "Method and Apparatus for Performing Post-Process Anti-aliasing of Polygon Edges", describes a hardware approach that transfers the aliased frame buffer contents into texture memory, and uses this texture to overdraw anti-aliased edges in a second pass.

Another solution proposed by M. Wimmer in his downloadable viewer "View3DX software" is to overdraw anti-aliased lines. Unfortunately, this approach failed without software sorting of all polygons.

The documentation for Microsoft's DirectX® software also mentions the use of edge overdraw to achieve anti-aliasing. It explains that redrawing every edge in a scene can work without introducing major artifacts, but it can also be computationally expensive. In addition, it can be difficult to determine which edges should be anti-aliased. The most important edges to redraw are those between areas of very different color (for example, silhouette edges) or boundaries between very different materials. Anti-aliasing the edge between two polygons of roughly the same color will have no effect, yet is still computationally expensive.

Building upon this knowledge base, the inventors have developed an edge overdraw approach that effectively reduces aliasing. They make the approach practical by efficiently detecting and rendering just the discontinuity edges, and introduce methods to maintain temporal smoothness, spatial consistency, and spatial sharpness.

SUMMARY

Systems and methods for discontinuity edge overdraw are described. In one aspect, a polygonal mesh is rendered to produce a computer-generated image. The image exhibits aliasing at its discontinuity edges. The discontinuity edges are sorted prior to overdrawing. The discontinuity edges are overdrawn as anti-aliased lines to reduce the aliasing.

DETAILED DESCRIPTION

Aliasing is an important problem when rendering polygon meshes, such as triangle meshes. A major component of aliasing occurs along discontinuity edges such as silhouettes, creases, and material boundaries. Reduction of aliasing artifacts along discontinuity edges of a render polygon mesh is achieved by overdrawing the edges as anti-aliased lines. The result of edge overdraw differs from traditional anti-aliasing methods like supersampling in that one side of each discontinuity edge is "bloated" by a fraction of a pixel.

As further refinements, the discontinuity edges are oriented consistently and blended as they approach silhouettes in the mesh to avoid popping at the edge, thereby achieving a temporal smoothness at the silhouettes. Unfortunately, edge blending may produce blurriness. Thus, to balance temporal smoothness with spatial sharpness, an asymmetric blending technique is employed. To further improve results, the discontinuity edges are sorted by depth prior to overdrawing them. These processes effectively reduce the "crawling jaggies" artifact.

Graphics Computing Device

Figure 2:
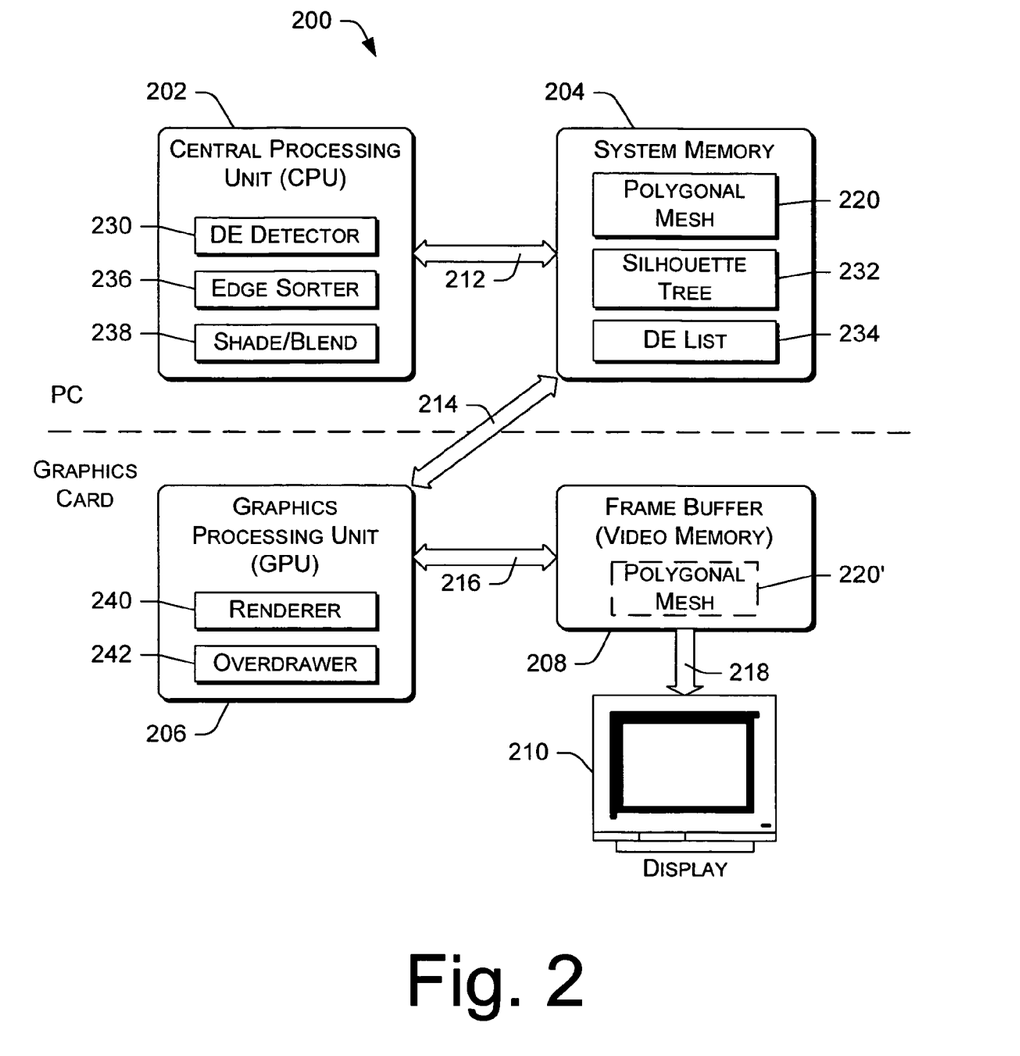
FIG. 2 is a block diagram of an exemplary graphics computing device that implements a discontinuity edge overdraw process for reducing the crawling jaggies.

FIG. 2 shows an exemplary graphics computing device 200 formed as a personal computer implemented with a graphics card. The computing device 200 includes a central processing unit (CPU) 202, a system memory 204, a graphics processing unit (GPU) 206, a frame buffer 208 that forms the video memory, and a display 210 (e.g., flat panel display, CRT monitor, etc.). The system memory 204 is implemented as a variety of one or more types of volatile memory (e.g., RAM, DRAM, etc.) and nonvolatile memory (e.g., ROM, Flash, EEPROM, disk, CD-ROM, etc.). The graphics processing unit 206 and frame buffer 208 are typically located on the graphics card, as illustrated by the dashed line separating card components from computer components.

The CPU 202, system memory 204, graphics processing unit 206, frame buffer 208, and display 210 are connected via a set of one or more buses 212, 214, 216, and 218. The buses may be integrated as one large system bus, or implemented as separate buses. Separate buses are illustrated to pictorially represent a graphics rendering pipeline from the CPU 202 to the display 210. The buses may be any of a variety of bus architectures including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

A polygon mesh 220 is stored in system memory 204, or alternatively in frame buffer 208 as illustrated by the dashed lines. This mesh 220 holds a collection of polygons that are used to generate graphic images. In one implementation, the polygon mesh 220 is composed of a collection of triangles.

One or more functional modules are illustrated within various components to demonstrate the functions performed by the graphics computing device 200, as well as the exemplary components that perform such functions. The CPU 202 has a discontinuity edge (DE) detector 230 that is formed in hardware or software to detect edges in a polygon mesh 220. The discontinuity edges are categorized into two edge types: (1) "silhouette edges", which limit the extent of the projected surface, and (2) "sharp edges", which mark shading discontinuities due to material boundaries or discontinuities in material attributes like normals and colors.

A silhouette tree structure 232 is shown stored in system memory 204. The silhouette tree 232 is a data structure that is used by the DE detector 230 to identify silhouette edges at each frame for a particular viewpoint. The silhouette search structure 232 stores all edges so that those that are silhouettes with respect to a given view may be found quickly. Once found, the extracted silhouette edges are collected and stored together with the sharp edges in a discontinuity edge (DE) list 234. The DE list can either be unsorted or sorted (as explained below in more detail).

The CPU 202 also includes an edge sorter 236 and a shade/blend module 238. The edge sorter 236 performs optional edge sorting tasks to sort the edges in the DE list 234 according to which edges are visible. The shade/blend module 238 shades and/or blends the edges. The DE detector 230, edge sorter 236, and shade/blend module 238 may be implemented in hardware within the CPU 202, or as software that is stored in system memory and executed on the CPU 202.

The GPU 206 includes a rendering module 240 and an overdrawing module 242, which can be implemented in hardware or a combination of hardware and software. The rendering module 240 renders the triangles from the mesh 232 and places the rendered images in the frame buffer 208.

Figure 3:
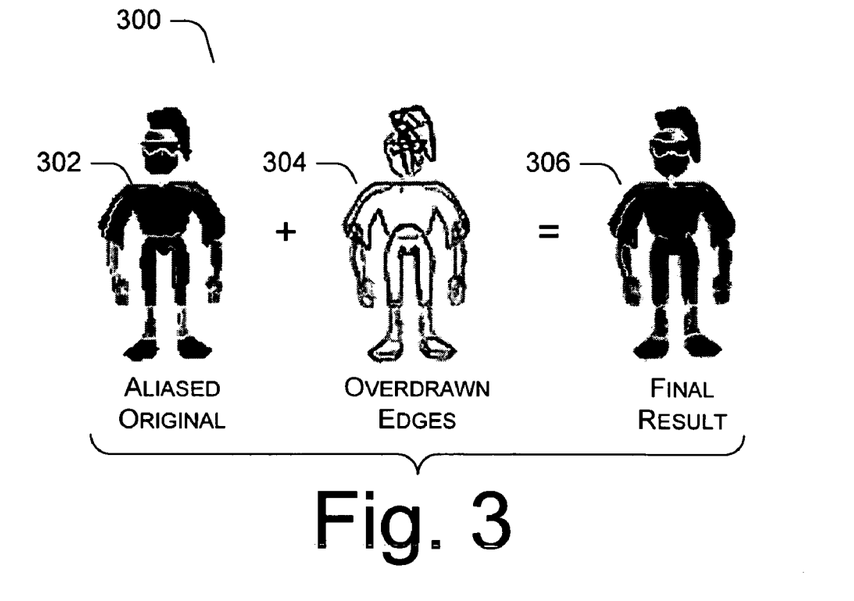
FIG. 3 illustrates three graphical images to help demonstrate the effects of the discontinuity edge overdraw process.

FIG. 3 shows a series 300 of three images references as numbers 302, 304, and 306. The first image 302 illustrates the original rendered image with anti-aliasing along certain edges.

The overdrawing module 242 overdraws the discontinuity edges detected by the DE detector 230 as anti-aliased lines. The overdrawing module 242 exploits existing hardware capable of rendering anti-aliased lines, which is well-known in the art of computer graphics. The overdrawn edges are illustrated as image 304 in FIG. 3. The z-buffer is used to resolve visibility between the mesh triangles and the overdrawn edges. The number of discontinuity edges is typically much smaller than the number of triangles or pixels, so the overall frame time overhead is small.

The overdrawn edges are effectively superimposed on the rendered image in the frame buffer 208 to significantly reduce the "crawling jaggies" caused by the aliasing along the edges of the rendered mesh. The final result is illustrated as image 306 in FIG. 3. Notice the reduction in jaggies from the original image 302, thereby improving rendering quality. In addition to reducing aliasing along the edges, the shade/blend module 238 helps maintain temporal smoothness, spatial consistency, and spatial sharpness. The rendered image is then scanned out to display 210.

Overdraw Method

Figure 4:
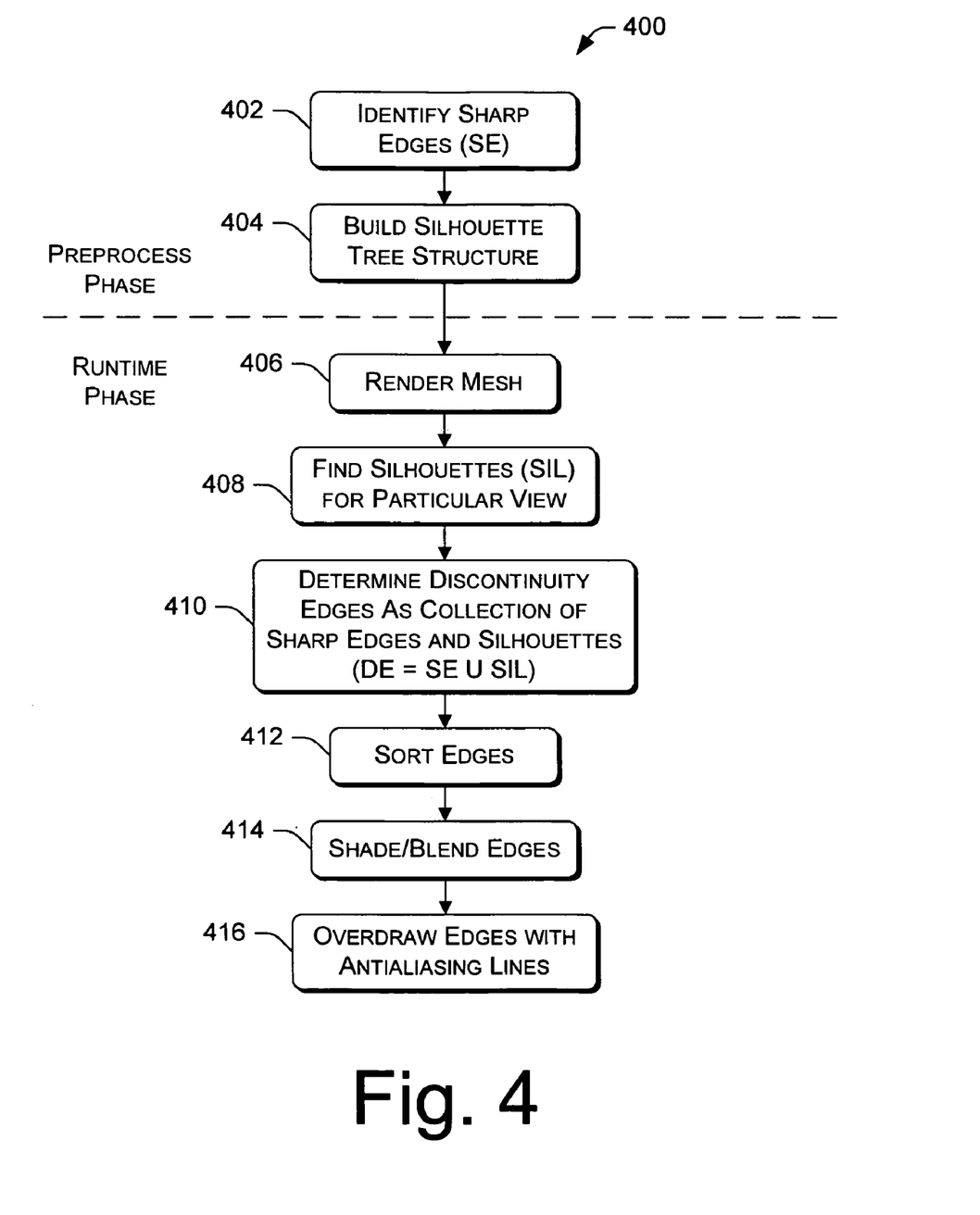
FIG. 4 is a flow diagram of the discontinuity edge overdraw process implemented by the device of FIG. 2.

FIG. 4 shows a process 400 for rendering polygonal meshes in a way that reduces aliasing along edges. The process 400 is implemented by the graphics computing device 200 and where appropriate, will be described with reference to various exemplary components that perform the various acts. The acts shown in the process can be implemented in hardware, software, or a combination of hardware and software.

The process 400 is divided into to phases: a preprocess phase and a runtime phase. The preprocess phase is performed at the CPU 202 in preparation to the runtime phase. The blocks in FIG. 4 are separated by a dashed line to differentiate between preprocess operations and runtime operations.

Preprocess Phase

At block 402, the CPU 202 begins the preprocess phase by identifying sharp edges (SE). Recall that discontinuity edges are a union of sharp edges (which mark shading discontinuities) and silhouette edges (which limit the extent of the projected surface). Because sharp edges demarcate shading discontinuities, this set of edges is static and hence view independent. Therefore, sharp edges can be collected during the preprocess phase, rather than during runtime, and are subsequently overdrawn at every frame. The sharp edges are stored in the DE list 234. Fortunately, the number of sharp edges is typically a small fraction of the total number of edges. Consistent orientations are then assigned to the sharp edges.

Silhouette edges, in contrast, are based on the viewpoint. An edge is a silhouette edge if one of its adjacent faces is frontfacing and the other backfacing. For many meshes, the average number of silhouette edges per view is only $o(\sqrt{n})$, where n is the number of mesh edges. So, typically only a small fraction of mesh edges will be overdrawn as silhouette edges.

Collecting the silhouette edges can be done in a brute-force manner by checking all mesh edges in o(n) time. To accelerate this process, the CPU-based DE detector 230 employs a fast silhouette extraction algorithm whose average running time is proportional to the number of output silhouette edges. An exemplary algorithm is described by Sander, et al., in "Silhouette Clipping", SIGGRAPH 2000, pp. 327-334.

At block 404, the CPU 202 constructs the silhouette tree structure that is used by the algorithm as a search hierarchy in which nodes represent clusters of mesh edges. The silhouette tree 232 is a data structure stored in system memory 204. Then, for a given viewpoint at runtime, the DE detector 230 traverses the hierarchy and is able to quickly skip entire subtrees that contain no silhouette edges.

Runtime Phase

At block 406, the rendering module 240 of the graphics processing unit 206 renders an image as a triangle mesh (or other polygon mesh). For efficiency, it is specified as a display list of triangle strips. The z-buffer is used to resolve occlusion, and is saved for use during edge overdraw. The image is placed in the frame buffer 208.

At block 408, the silhouette edge detector 230 of the CPU 202 identifies the silhouettes for a particular view or scene using the silhouette search structure 232. Found silhouettes are stored in the DE list 234. For a closed object, silhouette edges that are concave (having an outer dihedral angle ≦180 degrees) are always occluded. Therefore, such concave edges need not be entered into the search structure 232. This typically reduces the number of edges in the structure by 40%. Furthermore, since sharp edges are typically overdrawn, they too are omitted, resulting in an additional reduction of about 10%.

At block 410, the discontinuity edge detector 230 produces a set of discontinuity edges as a union of the sharp edges identified in preprocessing and the silhouettes identified during runtime, which are both stored in the DE list 234.

Occasionally, artifacts are produced when silhouettes lie in front of other discontinuity paths. These artifacts can be removed by sorting the edges in back-to-front order prior to rendering them during the subsequent overdraw operation. At block 412, the edge sorter 236 may be used to sort the discontinuity edges in the DE list 234 according to visibility.

In one implementation, the edge sorter uses the z-buffer values that determine the depth dimension of the edges. The edges are sorted according to the distance from the viewpoint to the edge midpoint. Although this midpoint depth-sort heuristic occasionally gives an incorrect sort, artifacts are rare and comprise only a few isolated pixels. By comparison, traditional back-to-front polygon rendering requires correct occlusion-based ordering since mistakes there are much more evident.

Of all sharp edges, only the sharp edges on or near the silhouette occlude other discontinuity edges. An edge is declared to be near the silhouette if it has β<0.1 or β>0.9, where β is a blend parameter defined below. Thus, one optimization is to include only these sharp edges in the sort along with the other silhouette edges. The remaining sharp edges are simply drawn first.

The sorting operation incurs some computational cost, and hence is optional. It is beneficial when there are many discontinuity edge crossings.

At block 414, the shade/blend module 238 of the CPU 202 shades and/or blends the discontinuity edges. To shade each discontinuity edge, the module 238 uses shading parameters (e.g. normals, colors, textures, texture coordinates) taken from the edge's neighboring faces, denoted as the left and right faces. How the shading parameters of the left and right face are combined depends on the category of the discontinuity edge.

First, consider silhouette edges. The case of a non-sharp silhouette edge is relatively straight forward since the shading parameters of the two adjacent faces agree. At a sharp silhouette edge, the shading parameters of the two faces are different, and the edge should be shaded using the parameters of the frontfacing adjacent face. Note that depending on object orientation, a given sharp edge may appear on the silhouette with either the left face frontfacing, or the right face frontfacing.

The troublesome case is that of a sharp edge not on the silhouette. To maintain temporal continuity, the edge should somehow smoothly transition to the shading parameters of either the left face or the right face as it approaches the silhouette. Otherwise, abruptly switching the shading parameters from one face to the other would result in a "popping" artifact.

Figure 5:
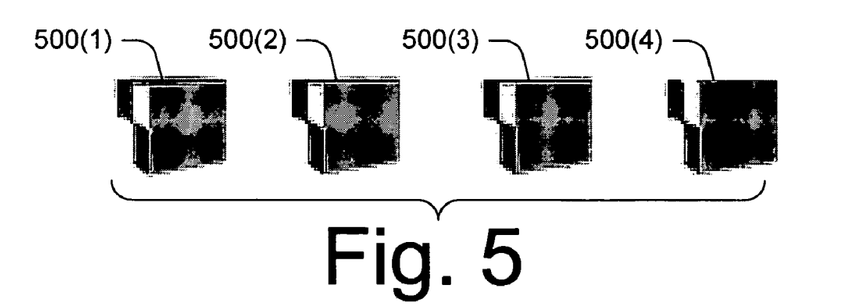
FIG. 5 illustrates a four-frame series of a moving graphical image to demonstrate a "popping" effect.

FIG. 5 shows a four-frame series consisting of four frames 500(1)-500(4) that are drawn without the benefit of edge blending to demonstrate the "popping" effect. Notice that as the sharp edge approaches the silhouette with the wrong shading from frame 500(3) to frame 500(4), a popping artifact is produced as the darker top line instantly disappears.

To solve this problem, for intermediate views where both adjacent faces are frontfacing, the shade/blend module 238 shades the edge as a combination of the two faces' shading states. A blend parameter β is computed based on the inner products of the viewing direction with the two adjacent face normals:

V=eye−edge.midpoint
dotL=V·edge.leftFace.faceNormal
dotR=V·edge.rightFace.faceNormal
β=dotR/(dotL+dotR).

Shading is then blended using the following relationship:

(1−β)leftShading+(β)rightShading.

To achieve this blending, two alternate schemes may be used: "blended-draw" and "double-draw". The edge blended-draw scheme renders the edge once, as a blended combination of the two shading functions. Ideally, the blending is performed with post-shaded color values. For texture-mapped meshes, this is achieved using hardware multitexturing to blend the two adjacent textures. For Gouraud-shaded surfaces, current hardware does not permit blending of post-shaded results (without resorting to shading on the host CPU). Future hardware supporting programmable shading will permit post-shaded blending. For now, the shading attributes (e.g. normals and colors) are interpolated prior to hardware shading. One drawback is that blending of normals can cause false highlights on sharp crease edges.

The edge double-draw scheme renders the anti-aliased edge twice, once using the shading function of the left face, and once using that of the right face. An opacity value (alpha) is specified for compositing each edge "over" the frame buffer. At least one of the edge renderings must use alpha=1 to prevent the aliased background pixels from showing through. Moreover, the backface shading must be attenuated to zero as the edge approaches the silhouette, to avoid popping. If this backface shading edge is the one drawn with alpha=1, there is no way to eliminate its contribution by rendering the second anti-aliased line over it (due to the anti-aliased line's partial coverage). Accordingly, a simple order-switching algorithm is used. Specifically, if β<0.5, we first render with left face shading and alpha=1, followed by right face shading and alpha=β. Otherwise we first render with right face shading and alpha=1 followed by left face shading with alpha=1−β. Although this results in a slight discontinuity at the β=0.5 transition, it is not perceptible in practice.

For blending, the edge double-draw scheme is preferred for its implementation simplicity. Also, it does not require multitexturing and does not exhibit false highlights due to pre-shaded blending.

Figure 6:
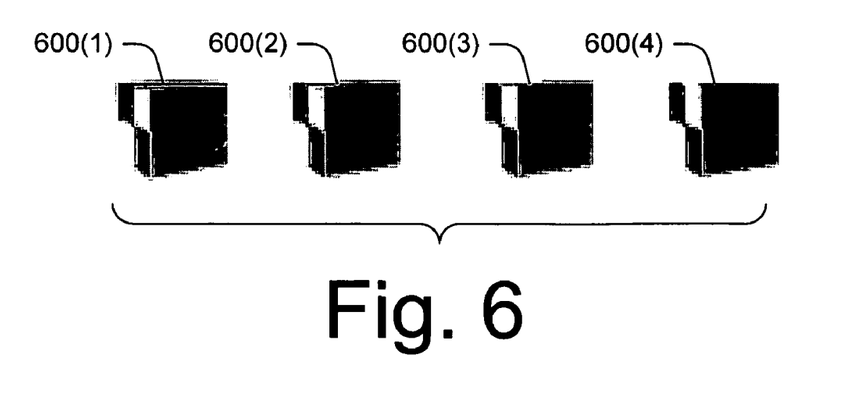
FIG. 6 illustrates a four-frame series of the moving graphical image that is generated with additional shading to reduce the "popping" effect.

FIG. 6 shows the same four-frame series as that of FIG. 5, but with the image in each frame being drawn using the double-draw scheme. Notice the smoother transition from frame-to-frame in comparison to non-blended images of FIG. 5.

Although blending is beneficial to avoid temporal popping, it tends to blur the discontinuity edge because the shading of the blended edge agrees with neither of the adjacent faces. To compromise between the competing goals of temporal smoothness and spatial sharpness, a hybrid approach uses the parameters from a single face (the left face) as much as possible, while still avoiding objectionable pops.

To improve the sharpness at the edge, the blend parameter β is mapped through an asymmetric transfer function:

$$\beta' = \begin{cases} 0, & \text{if } \beta \le \tau \\ (\beta - \tau)/(1 - \tau), & \text{otherwise,} \end{cases}$$

The edges are blended using the resulting β'. We find that with τ set to 0.9, edge transition are still temporally smooth, but the fraction of blended sharp edges drops from about 30% to 2% on average. In addition to restoring edge sharpness and saving blending operations, asymmetric blending allows most of the edge geometry to remain static, possibly cached on the graphics card. This may be exploited by first rendering all sharp edges as a display list and then the few blended edges.

Figure 7:
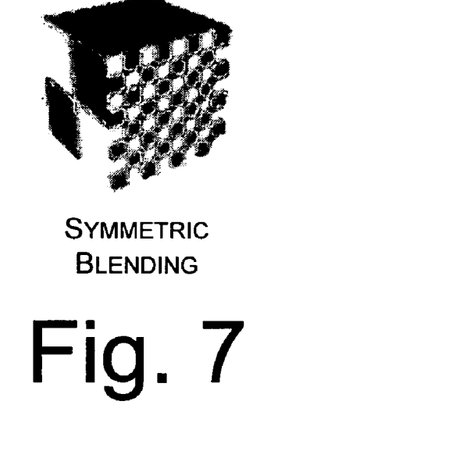
FIG. 7 illustrates a graphical image rendered using symmetric blending techniques at discontinuity edges to demonstrate a blurriness effect.
Figure 8:
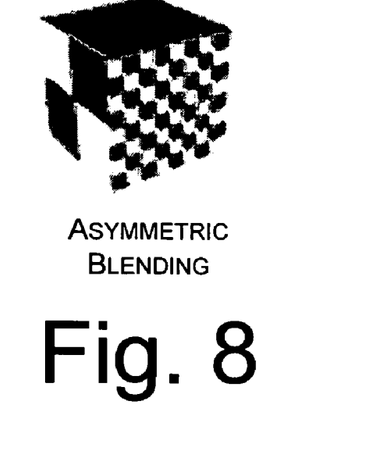
FIG. 8 illustrates the graphical image rendered using asymmetric blending techniques at discontinuity edges to reduce the blurriness effect.

FIGS. 7 and 8 show the same image, but FIG. 7 illustrates the image with symmetric blending whereas FIG. 8 shows the image with asymmetric blending. With asymmetric blending (FIG. 8), a non-silhouette sharp edge is usually drawn using the shading parameters of the left face. This has the drawback of shifting the proper material boundary by half a pixel. However, this is less objectionable than the extra softening or blurring that occurs when using symmetric blending.

When referring earlier to the left/right faces of an edge, an edge orientation is assumed. If a shading discontinuity consists of several sharp edges along a path and the orientation of each edge in the path is selected independently, then an asymmetric blending bias results in staggered-looking discontinuities. The solution to reducing these discontinuities is to orient discontinuity edges consistently using an orientation algorithm. Orientation of sharp edges may be performed during the preprocessing phase prior to runtime.

Figure 9:
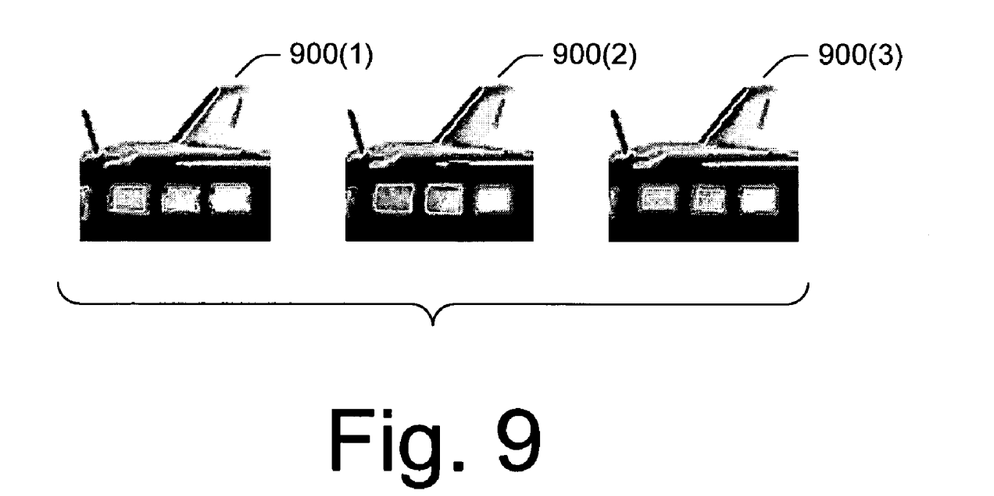
FIG. 9 illustrates three instances of the same frame of a graphical image, where the first frame instance is produced without any orientation of the discontinuity edges, the second frame instance is produced with per-path orientation, and the third frame instance is produced using global heuristic orientation.

FIG. 9 shows three instances 900(1)-900(3) of the same frame to illustrate different orientation approaches. The first instance 900(1) illustrates the case without orientation of the discontinuity edges to demonstrate the staggered-looking discontinuities.

Using a per-path orientation approach, sharp edges are first concatenated together into sharp paths. Two adjacent sharp edges are placed in the same path if their shared vertex has no other adjacent sharp edges. For each path, we assign an orientation to one edge, and then locally propagate this orientation along the entire path. However, if each sharp path is oriented independently, some regular structures appear non-uniform. For example, the second frame instance 900(2) in FIG. 9 shows that some patches might appear larger than others.

This is resolved using a global heuristic that begins by picking two arbitrary orthogonal vectors, such as $g_1=(2,5,1)$ and $g_2=(2,1,-9)$. For each sharp path, a representative edge is determined as the one whose midpoint is farthest along the vector $g_1$. The orientation of this edge is then assigned based on the sign of the dot product between the edge vector and the vector $g_2$. Given this first edge orientation, the process locally propagates along the sharp path as before. The result is shown as the third frame instance 900(3) in FIG. 9.

With reference again to FIG. 4, at block 416, the overdrawing module 242 of the graphics processing unit 206 overdraws the discontinuity edges with anti-aliasing lines. In one implementation, once shading parameters are determined, the edges are once again rendered into the frame buffer 208 as anti-aliased lines. Alpha blending is configured so that the lines are drawn using an "over" operation. The z-buffer test is enabled to avoid drawing occluded edges. The z-buffer write is disabled so that chains of anti-aliased edges do not have gaps at the shared endpoints between individual edges.

The rendering process 400 may be implemented in software that, when executed, directs the graphics computing device to perform the various functions. The following pseudo code represents an exemplary implementation of the process 400.

```
Preprocess
    Collect sharp edges Sharp in scene;
    Assign consistent orientations to Sharp;
    Construct silhouette extraction tree (excluding sharp & concave);
Runtime (given viewpoint for each frame)
    Render scene;
    S = Ø;
    for edge e in Sharp
        d_left = dot(e.f_left.normal , e.midpoint − viewpoint);
        d_right = dot(e.f_right.normal , e.midpoint − viewpoint);
        if d_left < 0 and d_right < 0 then continue; // backfacing
        e.β = d_right / (d_left + d_right);
        if 0.1 < e.β < 0.9 then
            Render e with α = 1.0 using e.f_left shading;
        else
            S = S ∪ {e};
    Extract silhouette edges Sil given viewpoint;
    S = S ∪ Sil;
    Sort S in back-to-front order;
    for edge e in S
        if e ∈ Sil then
            Render e with α = 1.0 using e.f_front shading;
        else if e.β < 0.9 then
            Render e with α = 1.0 using e.f_left shading;
        else
            e.β' = (e.β − 0.9) / (1.0 − 0.9);
            if e.β' < 0.5 then
                Render e with α = 1.0 using e.f_left shading;
                Render e with α = e.β' using e.f_right shading;
            else
                Render e with α = 1.0 using e.f_right shading;
                Render e with α = 1.0 − e.β' using e.f_left shading;
```

Experimental Results

The graphics rendering process described above was implemented, tested, and observed by the inventors. The software was written using OpenGL. It was implemented and tested on a Pentium III 800 MHz PC with an NVIDIA GeForce2 graphics card. The inventors further verified that the process works on an SGI Octane graphics card.

The inventors used the OpenGL® API function glEnable (GL_POLYGON_OFFSET_FILL) to perturb z-buffer values of triangles behind those of lines. This was done so that anti-aliased lines pass the z-buffer test to cover the crawling jaggies. For edges adjacent to triangles with high depth slope, the inventors observed remaining aliasing artifacts, suggesting that the function glPolygonOffset( ) feature is not pushing the triangles back sufficiently. The presence of these artifacts varies with the particular graphics hardware.

For efficiency, GL_BLEND is enabled for rendering lines. The lines are rendered using the default glLinewidth (1.0f).

When edge sorting is enabled, qsort( ) is employed. A faster algorithm, like bucket sort, could further improve the timing results when rendering high-resolution models.

The system was tested on six models. The preprocessing bottleneck is the creation of the silhouette tree, which is currently unoptimized and can take several minutes on large models. Collecting the sharp edges and assigning them consistent orientations takes only a few seconds.

Runtime results are shown in Table 1. Note that the extracted silhouette edges do not include silhouette edges that are sharp or concave. Rendered edges excludes back-facing sharp edges. The ship example has a higher performance overhead because it is geometry-bound and has a high number of discontinuity edges.

TABLE 1

| Model | man | plane | stoneh | dino | ship |
|---|---|---|---|---|---|
| Faces | 1,586 | 8,000 | 1,380 | 43,866 | 85,068 |
| Edges | 2,379 | 12,000 | 2,070 | 65,799 | 127,602 |
| Sharp edges | 354 | 2,085 | 1,250 | 900 | 19,769 |
| Edge statistics averaged over 100 viewpoints | | | | | |
| Extracted sil. edges | 94 | 393 | 22 | 365 | 7,122 |
| Rendered edges | 373 | 1,727 | 952 | 1,894 | 21,980 |
| Sorted edges | 309 | 1,212 | 661 | 1,240 | 16,448 |
| Blended edges | 6 | 23 | 10 | 23 | 266 |
| Rendering time per frame (in milliseconds) | | | | | |
| No edge overdraw | 7.2 | 9.8 | 9.6 | 18.9 | 40.1 |
| Unsorted edge overdraw | 7.7 | 10.3 | 10.7 | 20.0 | 88.4 |
| Sorted edge overdraw | 7.7 | 10.8 | 10.7 | 23.3 | 121.2 |

Conclusion

Described above is an edge overdraw technique that reduces discontinuity edge artifacts. For typical models having a small proportion of discontinuity edges, edge overdraw can be performed with little added cost. While the method is designed for spatial anti-aliasing, it reduces the "crawling jaggies" artifact.

The process generalizes to the case of meshes with boundaries. A boundary edge can be thought of as a smooth edge with an outer dihedral angle of 360 degrees. Thus, it is reported as a silhouette edge for all viewpoints. The edge is shaded using the attributes of its one adjacent face. With surface boundaries, the mesh interior may become visible, so some of the optimizations may be disabled. For instance, concave edges are no longer omitted from the silhouette search structure and sharp edges are drawn even if they are backfacing.

Edge overdraw extends triangles by a fraction of a pixel along discontinuities. At silhouette edges, this essentially enlarges the foreground object slightly at the expense of the background. This is done since the frame buffer lacks information about what lies behind the foreground object at partially covered pixels drawn in the foreground.

For a scene with many objects, edges can be overdrawn after all objects are rendered. Alternatively, edge overdraw can be applied after the rendering of each object. In that case, the objects are rendered in back-to-front order if one desires correct behavior at object silhouettes.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   rendering a polygonal mesh to produce a computer-generated image, the computer-generated image exhibiting aliasing at its discontinuity edges;
   sorting the discontinuity edges prior to overdrawing to remove artifacts produced when silhouettes lie in front of other discontinuity edges; and
   overdrawing the discontinuity edges as anti-aliased lines to reduce the aliasing.

2. A method as recited in claim 1, wherein the polygon mesh comprises a set of triangles.

3. A method as recited in claim 1, wherein the computer-generated image is stored in memory after rendering, and the overdrawing comprises rendering the discontinuity edges as anti-aliased lines in the memory to reduce the aliasing at the discontinuity edges.

4. A method as recited in claim 1, further comprising identifying the discontinuity edges as a collection of silhouettes and sharp edges.

5. A method as recited in claim 1, further comprising:
   identifying sharp edges prior to said rendering; and
   finding silhouette edges during runtime, the discontinuity edges being a union of the sharp edges and the silhouette edges.

6. A method as recited in claim 1, further comprising shading the discontinuity edges.

7. A method as recited in claim 1, further comprising blending selected discontinuity edges.

8. A method as recited in claim 1, further comprising orienting the discontinuity edges in a consistent manner.

9. A method as recited in claim 1, further comprising asymmetrically blending selected discontinuity edges.

10. A graphics computing device comprising:
    a memory to store a polygon mesh; and
    a processing unit to render the polygon mesh, the processing unit being further configured sort the discontinuity edges and then overdraw the discontinuity edges of the polygon mesh as anti-aliased lines, the sort to remove artifacts produced when silhouettes lie in front of other discontinuity edges.

11. A graphics computing device as recited in claim 10, wherein the polygon mesh comprises a set of triangles.

12. A graphics computing device as recited in claim 10, wherein the processing unit is configured to detect the discontinuity edges as a collection of sharp edges and silhouettes.

13. A graphics computing device as recited in claim 10, wherein the processing unit comprises:
    a central processing unit configured to detect the discontinuity edges; and
    a graphics processing unit configured to render the polygon mesh and to overdraw the discontinuity edges.

14. A graphics computing device as recited in claim 10, further comprising a frame buffer to store the rendered mesh, the processing unit being configured to render the discontinuity edges as anti-aliased lines in the frame buffer.

15. A graphics computing device as recited in claim 10, wherein the processing unit is further configured to shade the discontinuity edges.

16. A graphics computing device as recited in claim 10, wherein the processing unit is further configured to blend selected discontinuity edges.

17. A graphics computing device as recited in claim 10, wherein the processing unit is further configured to orient the discontinuity edges in a consistent manner.

18. A graphics computing device as recited in claim 10, wherein the processing unit is further configured to asymmetrically blend selected discontinuity edges.

19. A graphics processing system comprising:
    a renderer configured to render a polygon mesh;
    a discontinuity edge detector configured to detect discontinuity edges in the polygon mesh;
    an edge sorter to sort the discontinuity edges according to depth, the sort to remove artifacts produced when silhouettes lie in front of other discontinuity edges; and
    an overdrawer configured to overdraw the discontinuity edges as anti-aliased lines to reduce the aliasing.

20. A graphics processing system as recited in claim 19 further comprising:
    a data structure; and
    the discontinuity edge detector being configured to find silhouette edges in the polygon mesh using the data structure.

* * * * *